INVENTORS: J. R. PIERCE
H. SUHL
BY A. J. Torsiglieri
ATTORNEY

April 24, 1956 J. R. PIERCE ET AL 2,743,322

SOLID STATE AMPLIFIER

Filed Nov. 29, 1952 3 Sheets-Sheet 2

INVENTORS: J. R. PIERCE
H. SUHL
BY A. J. Torsiglieri
ATTORNEY

INVENTORS: J. R. PIERCE
H. SUHL
BY A.J. Torsiglieri
ATTORNEY

United States Patent Office 2,743,322
Patented Apr. 24, 1956

2,743,322

SOLID STATE AMPLIFIER

John R. Pierce, Berkeley Heights, and Harry Suhl, Newark, N. J., assignors to Bell Telephone Laboratories, Incorporated, New York, N. Y., a corporation of New York Application November 29, 1952, Serial No. 323,330
15 Claims. (Cl. 179—171)

This invention relates to electronic apparatus, and more particularly to such apparatus which employs the interaction between a flow of charges in a solid and an electromagnetic wave.

There has been developed recently a class of devices, now generally designated as traveling wave tubes, which employ the interaction between a stream of electrons and an electromagnetic wave over a plurality of operating wavelengths to secure amplification of the electromagnetic wave. The traveling wave tube can be described as a vacuum tube in which a wave transmission circuit propagates an electromagnetic wave therethrough at velocities slower than the velocity of light and an electron stream is projected through the electromagnetic field of the traveling wave. By proper adjustment of the velocities of the propagated wave and the electron stream, the two can be made to interact in a manner to provide gain to the wave.

Hitherto, the usefulness of such devices has, to a considerable extent, been reduced by the various problems associated with the production of high density electron streams in a vacuum.

One object of the invention is to eliminate the need of electron streams in a vacuum in devices of this kind, and to provide thereby a novel form of solid state traveling wave amplifier.

To this end, the invention provides a device which employs the interaction between an electromagnetic wave and a flow of charges in a solid for amplification of the electromagnetic wave. Such a device might be designated a "solid state traveling wave amplifier." It is important in devices of this kind to employ a solid which is characterized by a high degree of charge mobility. Typical of such solids are semiconductors such as germanium and silicon, in a certain sense the metal bismuth, and ferrites operated near magnetic resonance.

In the operation of such devices, the flow of charges is made to transfer power to the electromagnetic wave in a manner analogous to the operation of conventional traveling wave tubes. For this purpose, there are utilized magneto-optic effects, such as the Hall and magneto-resistive effects which result from the interaction of A.-C. magnetic or electric fields with D.-C. magnetic or electric fields in the solid. As is well known, the Hall effect is the effect which results in a current flow in a solid along one of three mutually perpendicular axes in proportion to a current flow and a magnetic field along the other two, and the magneto-resistive effect is the effect which results in a current flow in a solid along a first axis in proportion to a magnetic field along this axis and a magnetic field and current flow along an axis perpendicular to the first axis. In devices in accordance with the invention, the magnetic field of the electromagnetic wave is made to set up magneto-optic currents in the solid which flow in a direction opposite to the conduction currents set up by the electric field of the electromagnetic wave. By making these magneto-optic currents exceed the conduction currents, there can be effected a power transfer from the flow of charges to the electromagnetic wave.

The invention will be more fully understood from the following more detailed description taken in conjunction with the accompanying drawings in which.

Figure 1:
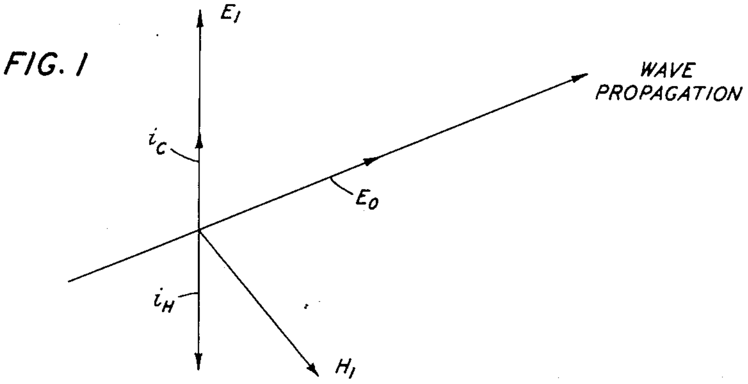
Fig. 1 is a vector diagram of the various field and current relationships desired in a solid state amplifier in accordance with the invention which employs the Hall effect to secure gain.

Before discussing specific embodiments of the invention, it will be helpful to develop some general principles. It will be convenient at this point to confine the analysis to the case in which the Hall effect of the various magneto-optic properties of a solid will be utilized in securing amplification of a wave which propagates along a wave circuit in coupling relation with the flow of charges in the solid.

To derive such amplification, it is obvious that there must be a continuous flow of power out of at least some elements of the solid and into the wave circuit. There is such a power flow if the real part of the divergence of the Poynting vector is positive.

In the following analysis M. K. S. units are used and it is assumed that all field quantities contain a factor $$\epsilon^{j\omega t}$$

and, accordingly, in the interest of simplicity, it is convenient to omit this expression in the equations which follow. E and H are taken as representing root mean square values of the total electric and magnetic field strength, respectively, in the region of interest. Let $E_0$ be the D.-C. field applied to a solid characterized by a dielectric coefficient $\epsilon$, a permeability coefficient $\mu$, a conductivity $\sigma$, and a Hall effect coefficient $\alpha$.

Let the Poynting vector be called P. Then by definition, $$\text{Div } P = \text{div}(E \times H^*)$$

where the asterisk denotes the complex conjugate. Then by expansion, $$\text{Div } P = H^* \cdot \text{curl } E - E \cdot \text{curl } H^* \quad (1)$$

In a medium which exhibits Hall effect the conduction current density $i$ is related to the total electric and magnetic fields, E and H, by an equation of the form $$i = \sigma E + \alpha E \times H \quad (2)$$

if there are neglected higher powers in H. To the first order in the A.-C. quantities, the A.-C. current $i$ is therefore $$\sigma E + \alpha E_0 \times H$$

Substituting this expression for the current in Maxwell's equations, it can be shown that $$\text{Curl } H = (J\omega\epsilon + \sigma)E + \alpha E_0 \times H \quad (3)$$

$$\text{Curl } E = -j\omega\mu H \quad (4)$$

Accordingly $$\text{Div } P = j\omega\mu H \cdot H^* + \omega\epsilon E \cdot E^* - \sigma E \cdot E^* + \alpha E_0 \cdot (E \times H^*) \quad (5)$$

The first two terms on the right are necessarily imaginary. Hence, $$Re\ \text{div}\ P = -\ E\cdot E^* + \alpha E_0\cdot Re(E\times H^*) \qquad (6)$$

or $$Re\ \text{div}\ P = -\sigma E\cdot E^* + \alpha E_0\cdot ReP \qquad (7)$$

Where "Re" is used to designate the real part.

It is immediately evident that to make Re div P as large as possible, the D.-C. electric field $E_0$ should be applied in the direction of the power flow, and it is assumed that this is done.

The first term on the right of Equation 7 is simply the heat loss. If there is to be power flow, there must be a component of E normal to the direction of power flow. Any component of E in the direction of power flow adds to the first term without affecting the second term. Thus, the longitudinal electric field associated with transverse magnetic waves is wasteful of power.

Suppose there is devised a circuit in which the first term on the right of Equation 7 is made sufficiently small in comparison to the second term, either as a result of special circuit properties or as a result of so large a D.-C. field $E_0$, that it can be neglected. Then Equation 7 can be written as $$\text{Div}\ ReP = \alpha E_0 ReP \qquad (8)$$

For simplicity, it is convenient to assume that P varies only in the propagation direction $z$. Then Equaltion 8 becomes $$\frac{dReP}{dz} = \alpha E_0 ReP \qquad (9)$$

whose solution is $$ReP = \text{constant times } e^{\alpha E_0 z} \qquad (10)$$

which indicates a power gain of amount $\alpha E_0$ nepers/meter.

It will be useful to have a vector diagram of the various relationships involved. Fig. 1 shows the relationships for the case of a plane electromagnetic wave in which the electric field $E_1$, the magnetic field $H_1$, and the propagation direction form a right handed triad and which is propagating through a medium having a high Hall effect angle, as for example, some bulk germanium, to which a D.-C. electric field $E_0$ is applied in the propagating direction. Two A.-C. currents will be set up in the medium: first, there is set up the ordinary A.-C. conduction current $i_c$ flowing in the direction of the A.-C. electric field vector $E_1$; and second, there exists the Hall current $i_H$ proportional to the product of the D.-C. electric field $E_0$ and the A.-C. magnetic field $H_1$ and flowing in the direction opposite to that of the current $i_c$. In order to supply net power to the wave, it is necessary that the Hall current $i_H$ exceed the conduction current $i_c$. This cannot be conveniently done for the case of a plane electromagnetic wave and it is generally necessary to employ a special form of transmission circuit for the propagating wave. Various circuit arrangements are described hereinafter for this purpose.

Figures 2, 3:
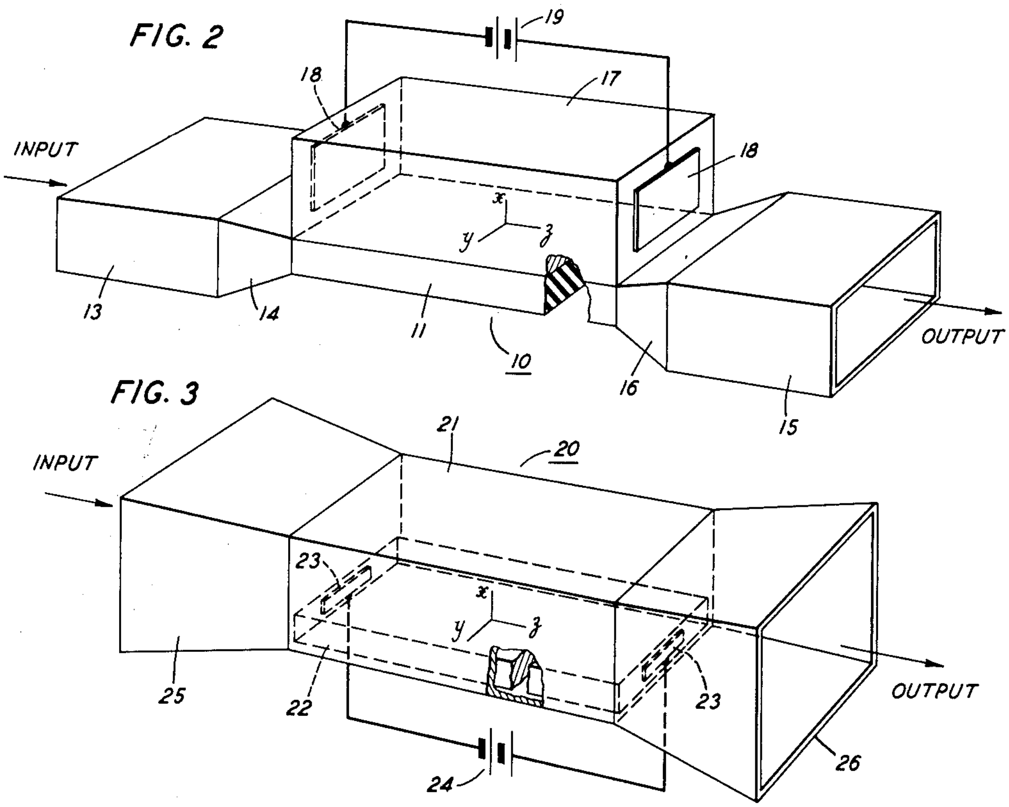
Figs. 2 through 5 show schematically various illustrative embodiments of the invention utilizing the Hall effect.

The case in which the electromagnetic wave to be amplified is characterized by a transverse electric field will first be examined. The amplifier 10 shown by way of example in Fig. 2 is adapted for the amplification of transverse electric waves, generally termed TE waves.

In the amplifier 10, a solid dielectric wave guide 11 which comprises a bar of material having a dielectric constant greater than unity provides a wave circuit in which the phase velocity therethrough is slow compared to the velocity of light. This bar is preferably of rectangular cross section of height slightly more than one half of the wavelength in the dielectric of the propagating wave to be amplified at mid-band frequency, of a width of several such wavelengths and of a length a plurality of such wavelengths. Waves, suitably polarized, are applied as an input to a coupling connection at one end thereof. In the case shown, the input waves are supplied from a hollow wave guide 13, of rectangular cross section larger than that of solid wave guide 11, and which can be a continuation of a conventional hollow wave guide wave transmission system. A transformer 14 which comprises a frustrum-shaped section of hollow wave guide is interposed between the hollow wave guide 13 and the dielectric wave guide 11 for impedance matching purposes. Alternatively, for example, the solid wave guide 11 may itself be a continuation of a wave transmission system which employs solid wave guides throughout. As is shown in Fig. 2 at its other end the dielectric wave guide 11 supplies the amplified output waves to a hollow wave guide coupling connection 15, also of rectangular cross section, by way of a transformer 16 in an arrangement similar to that of the input wave guide coupling connection 13, the transformer 14 and the dielectric guide 11.

In contact with the top surface of the guide 11, there extends an element 17 of a solid suitable for setting up Hall effect currents for interaction with the transverse electric waves propagating along the guide 11. The height of this element is preferably more than that of the guide 11. Electrodes 18, which are in contact with the two end faces of the element 17 and between which is connected a D.-C. voltage source 19, provide a D.-C. electric field $E_0$ therealong in a direction parallel to that of wave propagation along guide 11.

Now, assume that the D.-C. electric field $E_0$ has essentially only a longitudinal or $z$ component. The potential function F of the electromagnetic wave is used which is a function of $x$ and $y$. The function is such that $$H_x = \frac{\partial F}{\partial x} \qquad (11)$$

$$H_y = \frac{\partial F}{\partial y} \qquad (12)$$

Therefore, since div $H=0$, $$H_z = \frac{\nabla^2 F}{j\beta} \qquad (13)$$

Also $$E_y = -\frac{\omega\mu}{\beta} H_x \qquad (14)$$

$$E_x = \frac{\omega\mu}{\beta} H_y$$

Hence $$\nabla^2 F = [\beta^2 - \omega^2\mu\epsilon + j(\omega\mu\sigma - \beta a E_0)]F \qquad (15)$$

Here $$\nabla^2 F = \frac{\partial^2 F}{\partial x^2} + \frac{\partial^2 F}{\partial y^2} \qquad (16)$$

The power flow per square meter in the $z$-direction, P, is found to be $$P = \frac{\omega\mu}{\beta}(H_y H_y^* + H_x H_x^*) \qquad (17)$$

or $$Re\ \text{div}\ P = Re\frac{(\omega\mu)^2}{\beta\beta}\left[-\sigma + \frac{\alpha E_0 \beta^*}{\omega\mu}\right]\left|H_t\right|^2 \qquad (18)$$

where $H_t$ is the transverse magnetic field.

Let $$\beta = b + ja \qquad (19)$$

Then $$e^{-j\beta z} = e^{-jbz}\epsilon^{az} \qquad (20)$$

and $$Re\ \text{div}\ P = \frac{(\omega\mu)^2}{b^2+a^2}\left[-\alpha + \frac{\alpha E_0 b}{\omega\mu}\right]|H_t|^2 \qquad (21)$$

Let it be assumed that for a given value of $b$, that is, for a given phase velocity, Re div P is positive. Then it can be seen from Equation 21 that the greater the absolute value of $a$ (i. e. the greater the rate of increase or decrease of the wave) the less is the power production, Re div P. Since the maximum power production is obtained for real values of $\beta$, it will henceforth be assumed that $\beta$ is real unless it is specified otherwise.

For real values of $\beta$, the phase velocity of the wave $v_f$ is $$v_f=\frac{\omega}{\beta} \qquad (22)$$

Also important is the drift velocity of the electron flow, $v_d$ in the solid 17. It can easily be shown that $$v_d=\frac{\alpha E_0}{\sigma\mu} \qquad (23)$$

It is also convenient to use two other quantities, the characteristic impedance of the dielectric medium $K_m$ and the characteristic velocity of a plane electromagnetic wave in the medium dielectric $v_m$. It is well known that $$K_m=\sqrt{\frac{\mu}{\epsilon}} \qquad (24)$$

$$V_m=\frac{1}{\sqrt{\mu\epsilon}} \qquad (25)$$

In terms of these new quantities $$Re \text{ div } P=\sigma K_m^2\left(\frac{v_f}{v_m}\right)^2\left[\frac{v_d}{v_f}-1\right]|H_t|^2 \qquad (26)$$

It can be seen that the power production is positive only if the drift velocity $v_d$ is greater than the phase velocity $v_f$, that is, if $$v_d>v_f \qquad (27)$$

This requires that the guide 11 be designed to provide a velocity of wave propagation therethrough slower than the drift velocity of electrons in the element 17. It is accordingly necessary to choose a geometry and a dielectric medium for the guide 11 which will provide a phase velocity to waves propagating therethrough which is slower than the drift velocity through the element 17.

It can be seen that the value of $v_f$ which gives maximum power production is $$V_{f_{max}}=\frac{v_d}{2} \qquad (28)$$

For this value of $v_f$ $$Re \text{ div } P=\frac{\sigma K_m^2}{4}\left(\frac{v_d}{v_m}\right)^2|H_t|^2 \qquad (29)$$

This can also be written $$Re \text{ div } P\frac{\sigma\mu^2 v_d^2}{4}|H_t|^2 \qquad (30)$$

It can be seen from Equation 30 that to make the power production large, and hence to provide high gain, the material of element 17 advantageously should be characterized by a high conductivity, a high permeability, and a high effective velocity such that their product should be large.

Moreover, it will be evident that in this and in other arrangements to be described hereinafter similar effects can be achieved by utilizing a solid of material in which conduction takes place by positive carriers, or "holes" instead of by electrons. Generally, this will require a reversal of the D.-C. electric fields set up in the solid.

One can now analyze in similar fashion the case where the electromagnetic wave to be amplified is a transverse magnetic or TM wave. An amplifier 20 for such operation is shown schematically, by way of example, in Fig. 3. A conductively bounded hollow enclosure such as the rectangular hollow wave guide 21 serves as the wave transmission circuit. Transverse magnetic waves to be amplified are applied as an input to one end thereof by way of a suitable input coupling connection 25 and amplified output waves are abstracted at the opposite end similarly by way of a suitable output coupling connection 26. Within the wave guide 21, preferably extending between its two side walls and in contact with its bottom surface, there is disposed a rectangular element 22 of a solid in which Hall-effect current flow is to be set up for interaction with the wave propagating through the wave guide 21. Electrodes 23 in contact with the two end faces of the solid 22 and between which is connected the voltage source 24, serve to provide a longitudinal D. C. electric field $E_0$ in a direction parallel to that of wave propagation.

In the analysis of an arrangement of the kind shown in Fig. 3 a potential function G of the electromagnetic wave is used which is a function of $x$ and $y$. The function G is such that $$E_x=\frac{\partial G}{\partial x} \qquad (31)$$

$$E_y=\frac{\partial G}{\partial y} \qquad (32)$$

Therefore, since div E=0, $$E_z=\frac{\nabla^2 G}{(j\beta+\alpha E_0)} \qquad (33)$$

Also, $$H_x=-\frac{(j\omega\epsilon+\sigma)}{(j\beta+\alpha E_0)}E_y \qquad (34)$$

$$H_y=\frac{(j\omega\epsilon+\sigma)}{(j\beta+\alpha E_0)}E_x \qquad (35)$$

Hence, $$\nabla^2 G=[\beta^2-\omega^2\mu\epsilon+j(\omega\mu\sigma-\beta\alpha E_0)G \qquad (36)$$

If as in (19) above one lets $\beta=b+ja$, then it can be found that $$Re \text{ div } P=-\sigma E_z E_z^*+\frac{[-(b^2+a^2)\sigma+(b+a)\omega\epsilon\alpha E_0]}{(\omega\epsilon)^2+\sigma^2}\left|H_t\right|^2 \qquad (37)$$

The term involving $E_z$ is undesirable. Fortunately, it is possible to make $E_z=0$ over a line or over a surface. There will be considered power production in regions in which $E_z$ can be regarded as negligible. In this case it is seen from Equation 37 that Re div P is greater for waves that increase somewhat with distance ($a>0$) than it is for attenuated waves. That is, for a given value of $b$, there is an aptimum value of $a$. Also, the power production can be positive for a purely exponential variation with distance ($b=0$).

Nonetheless, the case will be considered chiefly in which $\beta$ is real ($a=0$). In this case $$Re \text{ div } P=-\sigma|E_z|^2+\frac{\sigma K_m^2\left(\frac{v_m}{v_f}\right)^2}{1+\left(\frac{\sigma}{\omega\epsilon}\right)^2}\left[\frac{v_f v_d}{v_m^2}-1\right]|H_t|^2 \qquad (38)$$

Since it is being assumed that the term in $|E_z|^2$ is zero, it can be seen that for power production to be positive one must have $$v_d>\frac{v_m^2}{v_f} \qquad (39)$$

One can realize this by making the phase velocity very large. To this end, the dimensions of the hollow wave guide 21 are advantageously chosen so that it operates very near cut-off, in which case the phase velocity $v_f$ becomes very large.

It can be seen that there is an optimum value of phase velocity for which $$\frac{v_f v_d}{v_m^2}=2 \qquad (40)$$

For this optimum phase velocity (and for $E_z=0$)

$$Re \text{ div } P=\frac{\sigma K_m^2\left(\frac{v_d}{v_m}\right)^2}{4\left(1+\left(\frac{\sigma}{\omega\epsilon}\right)^2\right)}|H_t|^2 \qquad (41)$$

This can be rewritten $$Re \text{ div } P=\frac{\sigma\mu^2 v_d^2}{4\left(1+\left(\frac{\sigma}{\omega\epsilon}\right)^2\right)}\left|H_t\right|^2 \qquad (42)$$

It can be seen from (42) that for increased gain, it is desirable to employ as the element 22 a solid which has a high permeability and in which high drift velocities are possible.

In the particular amplifier shown in Fig. 3, the actual gain will probably be less than predicted by (42) since its derivation has been predicated on the assumption that $E_z$ is negligible throughout the circuit while in practice this is true over a limited portion of the circuit.

Figures 4, 5:
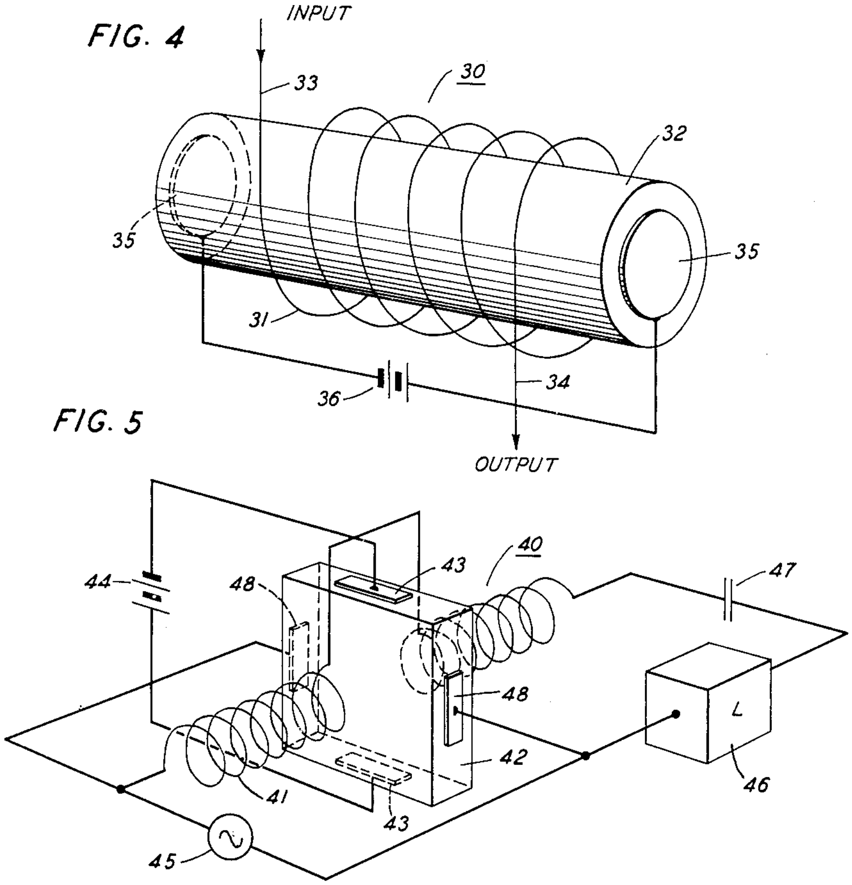

From the analysis set forth above, it is seen that for the amplification of transverse electric (TE) waves, there should be employed a circuit in which the wave phase velocity is lower than the drift velocity of the charged particles in the solid while for the amplification of transverse magnetic (TM) waves there should be employed a circuit in which the wave phase velocity is very high. By the use of composite waves, it is possible to have power production employing circuits which are characterized by intermediate phase velocities. Figs. 4 and 5 show circuits which are characterized by intermedite phase velocities suitable for use in the amplification of composite waves.

Typical of a high frequency amplifier suitable for the amplification of composite waves is the amplifier 30 shown in Fig. 4 which employs a helical conductor 31 as the wave interaction circuit. The conductor 31 is helically wound around an element 32 which preferably is a cylinder of material suitable for setting up of Hall-effect currents for interaction with the fields associated with the electromagnetic wave to be supplied to the helix circuit. Such a wave is applied to the input end of the helix for propagation therealong by a suitable coupling connection 33, shown here only schematically but which for example, can be of the kind employed in conventional helix-type traveling wave vacuum tubes for this same purpose. Similarly, the amplified wave is abstracted at the output end of the helix by a similar coupling connection 34. Electrodes 35 attached to the end faces of the cylinder 32 and between which is connected a voltage source 36 provide an axial electric field $E_0$. In some instances, it may be desirable to provide additional loading to the helix circuit by inserting additional capacitance across adjacent turns for reducing still further the axial velocity of the propagating wave.

In operation, input waves supplied to the input connection 33 propagate along the helix circuit and in the process are amplified by interaction with the Hall-effect currents set up in element 34 in accordance with the principles described. The amplified waves are abstracted at output connection 34 for utilization.

Fig. 5 shows an amplifier 40 which although not actually of the traveling wave type can be cascaded with other similar amplifiers to form a distributed wave type amplifier. It is intended for low frequency operation and is helpful in lending itself to a simplified explanation of the general principles of the amplification process. An inductive coil 41 is split and disposed as shown, with respect to a plate 42 of material having a large Hall effect, so that its axial magnetic flux permeates the plate. A pair of electrodes 43 arranged in contact with one set of opposite edges of the plate 42 and supplied from a suitable voltage source 44 are utilized to create a D.-C. electric field in the plate normal to the magnetic flux created therethrough by the coil. A source 45 of input signals is connected in series with the inductive coil 41 and a load or utilization apparatus 46. It is generally preferable to include also in series sufficient capacitance to reduce the reactance of this serially connected circuit, as, for example, by capacitance 47. A pair of electrodes 48 is disposed in contact with a different set of opposite edges of the plate 42 and these electrodes are connected in shunt across the signal source 45. The Hall-effect is that property of the material of plate 42 which results in a secondary current flow between the electrodes 48 which lie along one axis of the plate when a primary current flows through the plate between electrodes 43 when the plate is positioned in a magnetic field whose flux is in a direction at right angles both to the direction of primary current flow between the electrodes 43 and to the axis defined by the electrodes 48. The direction of this secondary current is determined by the relative direction of the primary current flow and the magnetic flux while the magnitude is determined by the strength of the D.-C. electric field provided by source 44 and that of the magnetic field provided by the signal current flow through the coil 41. Accordingly, this secondary current has the wave form of the signal current and if combined additively thereto will result in a power gain. To this end, the relative directions of primary current flow and the magnetic flux are adjusted so that the secondary current derived across the terminals 48 is added to the signal current whereby increased current is supplied to the load and a power gain is realized. For high power gains, it is possible to cascade a succession of single stage amplifiers of the kind described.

Figure 6:
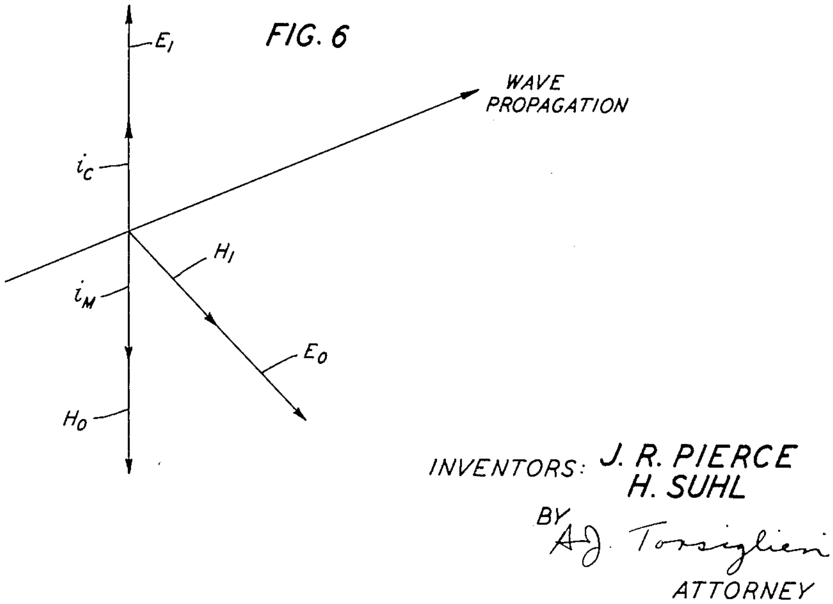
Fig. 6 is a vector diagram illustrating the current and field relationships desired for a solid state amplifier in accordance with the invention which employs the magneto-resistive effect to secure gain.

As has been indicated above, magneto-optic effects other than the Hall-effect can be utilized in accordance with the principles of the invention. Fig. 6 is a vector diagram illustrating the various field and current relationships of an amplifier which employs the magneto-resistive effect. A plane electromagnetic wave in which the directions of the electric field $E_1$, of the magnetic field $H_1$, and of wave propagation form a right-handed triad is propagating through a medium to which is applied a D.-C. field electric field $E_0$ to be parallel to the direction of the magnetic field $H_1$ and a D.-C. magnetic field $H_0$ to be in the direction parallel and opposite to that of the electric field $E_1$. In this case, although there will be no Hall-effect current, two currents will again be set up in the medium: first, there is set up a conduction current $i_c$ in the direction of the electric field $E_1$; and second, there will exist a magneto-resistive current $i_m$, of amplitude proportional to the magnetic field $H_1$, the D.-C. magnetic field $H_0$ and the D.-C. electric field $E_0$, and in a direction parallel but opposite to the conduction current $i_c$. For power again, this magneto-resistive current is made to exceed the conduction current $i_c$.

In general, the same considerations are applicable in achieving amplification by utilization of this effect as described for the Hall effect.

Figure 7:
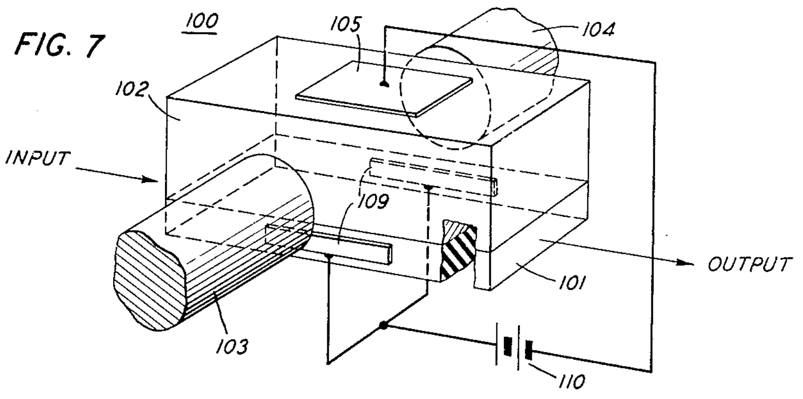
Figs. 7, 8 and 9 show schematically various solid state amplifiers in accordance with the invention which utilize the magneto-resistive effect.
Figures 8, 9:
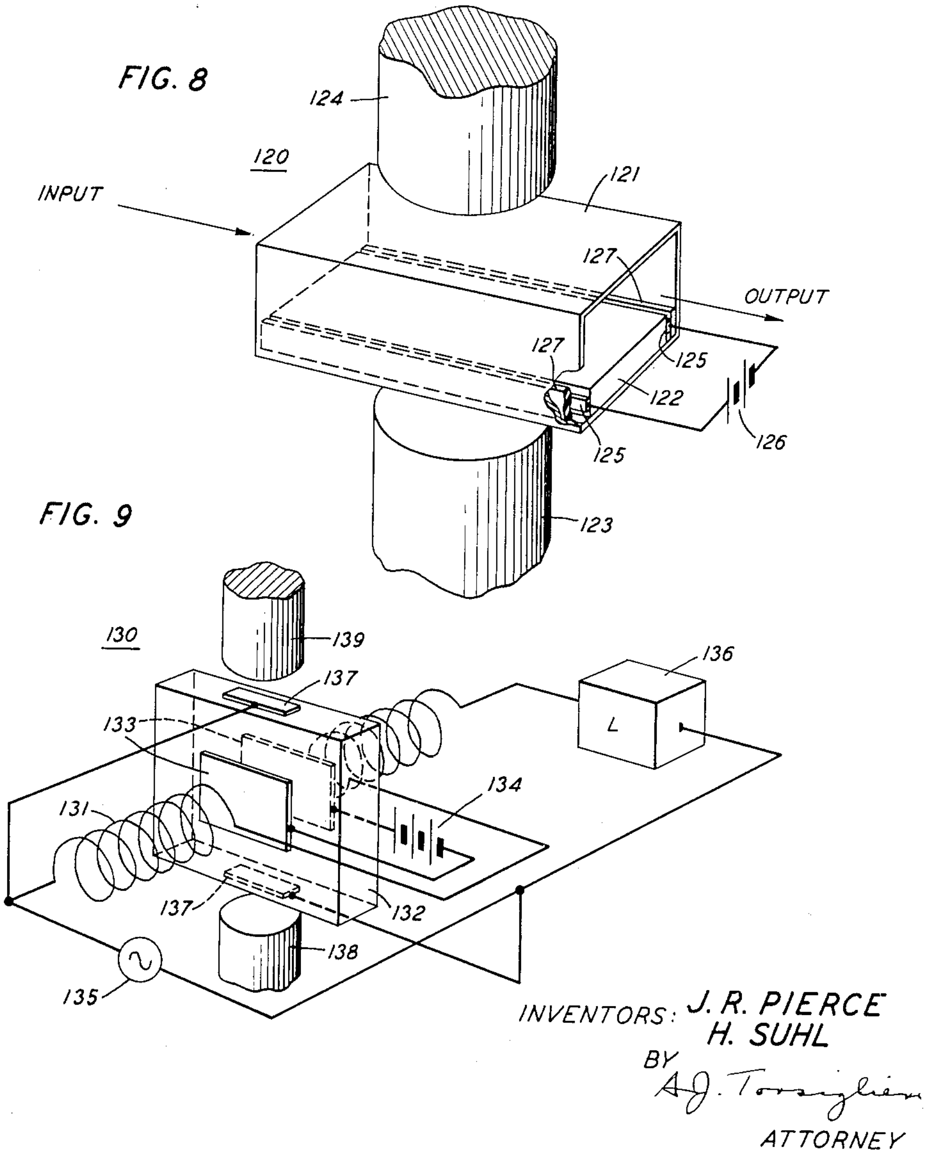

As with the Hall effect, in a solid state amplifier for utilizing this magneto-resistive effect, it is generally advantageous to employ special forms of circuits for propagating the electromagnetic wave to be amplified. In Figs. 7 through 9 there are shown, by way of example as typical, arrangements analogous to those shown in Figs. 2, 3 and 5, respectively, for the Hall-effect case.

Fig. 7 shows a solid state amplifier 100 which is especially adapted for the amplification of transverse electric waves. A solid dielectric wave guide 101 which comprises an elongated block rectangular in cross section and of material having a dielectric constant greater than unity provides a wave circuit in which the wave velocity therethrough is slow compared to the velocity of light. Waves suitably polarized are applied as an input to one end thereof and output waves are abstracted at the opposite end, in each case, by suitable coupling connections, not shown in detail but which can, for example, be of the kind employed in the amplifier shown in Fig. 2. In contact with the top surface of the guide 101 there extends an element 102 of a solid suitable for setting up magneto-resistive currents to be used for interaction with the transverse electric waves propagating along guide 101. Magnetic flux producing means, for example unlike poles of magnets 103 and 104 are suitably positioned to create a D.-C. magnetic field $H_0$ in a direction transverse to that of wave propagation and in the direction parallel to the A.-C. electric field $E_1$ associated with the propagating wave. Additionally, there is provided a D.-C. electric field $E_0$, transverse to the direction of wave propagation and in the direction of the principal component of the A.-C. magnetic field. To this end, the top surface of the element 102 is provided with an electrode 105. However, since it is generally undesirable to interpose any conductive element between the dielectric wave guide 101 and the element 102, to create the desired D.-C. electric field, it is found advantageous to position a pair of electrodes 109 on the two opposite side faces of the guide 101. Both electrodes 109 are maintained at the same potential with respect to one another but at a potential difference with electrode 105 by means of the voltage supply 110. In this way, there is set up across the element 102 a D.-C. electric field $E_0$ which has a large component in the desired directional normal to the direction of wave propagation. The operation is essentially as described for the Hall-effect amplifier shown in Fig. 2. In this case, magneto-resistive currents which are set up in the element 102 are used to provide an A.-C. electric field which combines cumulatively with the electric field of the wave propagating through the guide 101 whereby amplification of this wave is secured.

Figure 8 shows an amplifier 120 particularly adapted for the amplification of an input transverse magnetic wave. A rectangular hollow wave guide 121 serves as the wave transmission circuit. Transverse magnetic waves to be amplified are applied as an input to one end thereof and amplified output waves are abstracted at the opposite end by suitable coupling connections. Within the wave guide 121 and preferably extending between its side walls in contact with its bottom surface, there is disposed an element 122 of a material which exhibits large magneto-resistive effects. Magnetic flux producing means, for example, unlike poles of the magnets 123 and 124 are disposed to set up between the top and bottom surfaces of the wave guide 121, a steady magnetic field in a direction transverse to that of wave propagation and in the direction of the principal component of the A.-C. electric field of the wave to be amplified. To this end, it is important that the wave guide 121 be of non-magnetic material, such as copper. Additionally, a D.-C. electric field is provided transverse to the direction of wave propagation and in the direction of the principal component of the A.-C. magnetic field of the propagating wave by means of a pair of electrodes 125 disposed on opposite side surfaces of the layer 122 between which is connected the voltage source 126. Dielectric elements 127 serve to insulate each of these electrodes from the side walls of the wave guide 121. The principles of operation are analogous to those described for the amplifier shown in Fig. 3.

Figure 9 shows an amplifier 130, which like the one shown in Fig. 5, is better suited for low frequency operation. An inductive coil 131 is split and disposed as shown with respect to a plate 132 of material having a large magneto-resistive effect so that the axial magnetic flux associated with the coil permeates the plate. A pair of electrodes 133 in contact with one set of opposite surfaces of the plate 132 and between which is connected a suitable voltage source 134 establishes a D.-C. electric field through the plate parallel to the direction of the axial magnetic flux created by the inductive coil 131. A source 135 of input signals is connected in series both with the inductive coil 131 and a load or utilization apparatus 136. It is often desirable to include sufficient capacitance to reduce the reactive component of this serially connected circuit, although none has been here shown. A pair of electrodes 137 in contact with a different set of opposite surfaces of the plate 132 is connected in shunt across the signal source 135. Additionally, flux producing means, as for example unlike poles of the magnets 138 and 139, are disposed to create a steady magnetic field through the plate 132 in the direction in alignment with the electrodes 137 and transverse to the direction of the D.-C. electric field set up between electrodes 133. In operation, because of the magneto-resistive property of the plate 132, the changing magnetic field across the plate 132 produced by the signal current flowing through coil 131, and the D.-C. magnetic field set up across the pole pieces of the magnets 138 and 139 acting on the current flow through the plate 132 resulting from the D.-C. electric field between electrodes 133 set up a magneto-resistive current flow between the electrodes 137 which has the wave form of the signal current. The direction of this magneto-resistive effect current is determined by the relative directions of the signal magnetic flux, the current flow between electrodes 133 and the D.-C. magnetic flux. These are advantageously adjusted so that the magneto-resistive current derived across electrodes 137 adds to the signal current whereby increased current is supplied to the load 136 and a power gain is realized. For high gains, it is possible to cascade a succession of single stage sections of the kind described.

It should be evident from the various illustrative embodiments that have been set forth that the principles of the invention can be utilized in a wide variety of forms. Accordingly, it is to be understood that the arrangements described merely illustrate the general principles of the invention. Various other arrangements can be devised by one skilled in the electronics art without departing from the spirit and scope of the invention.

What is claimed is:

1. In combination, an element of material exhibiting a large Hall effect, means for propagating signal electromagnetic waves axially through said element, and electrode means for creating a D. C. electric field axially along said element parallel to the direction of wave propagation, said D. C. electric field and the magnetic field associated with electromagnetic wave interacting continuously to provide a Hall effect field which combines with the electric field associated with the electromagnetic wave to provide amplification thereto.

2. In an amplifying device, an element of a medium exhibiting a large Hall effect, a wave circuit to be supplied with an electromagnetic wave in field coupling relation with the element whereby the electromagnetic wave will propagate axially along said element, and electrode means to be supplied with D. C. potentials positioned on opposite faces of said element for creating a D. C. electric field transverse to the direction of the magnetic field associated with the wave propagating along said element and parallel to the direction of wave propagation whereby there is set up a Hall effect electric field which combines with the electric field associated with the wave propagating along the element.

3. In an amplifying device, a wave transmission circuit to be supplied with a transverse electric wave for propagation therethrough for providing a phase velocity to the wave slow compared with the velocity of light, an element of material exhibiting a large Hall effect positioned in field coupling relation with said circuit whereby said wave propagates axially along said element, and electrode means to be supplied with D. C. potentials and positioned axially along said element for creating therealong a D. C. electric field parallel to the direction of wave propagation and perpendicular to the direction of the transverse electric field of said wave whereby there is set up a Hall effect electric field which combines with the transverse electric field of said wave.

4. In an amplifier, a wave transmission circuit to be supplied with a transverse magnetic wave for propagation therethrough for providing a phase velocity thereto fast in comparison with the velocity of light, an element of material exhibiting a large Hall effect positioned in field coupling relation with said circuit whereby said wave will propagate axially along said element, and electrode means to be supplied with D. C. potentials positioned axially along said element for creating therealong a D. C. electric field parallel to the direction of wave propagation and transverse to the direction of the magnetic field of said wave whereby there is created a Hall effect electric field which combines with the electric field of said wave.

5. In combination, an element of material exhibiting a large magneto-resistive effect, circuit means for propagating a signal electromagnetic wave axially through said element, electrode means for creating a D. C. electric field in said element in a direction transverse to the direction of wave propagation, means creating a D. C. magnetic field across said element perpendicular to said D. C. electric field, the magnetic field associated with the electromagnetic wave and the D. C. electric and magnetic fields interacting to provide a magneto-resistive effect electric field which combines with the electric field associated with the signal electromagnetic wave to provide amplification thereto.

6. In a microwave device, a wave transmission circuit to be supplied with the transverse electric wave for propagation therethrough providing a phase velocity to the wave slow compared to the velocity of light, an element of material exhibiting a large magneto-resistive effect positioned in field coupling relation with said circuit whereby said wave propagates along said element, electrode means to be supplied with D. C. potentials positioned on opposite faces of said element for creating therebetween a D. C. electric field perpendicular to the direction of wave propagation and to the direction of the transverse electric field of said wave, and means for creating a D. C. magnetic field perpendicular to the direction of wave propagation and the direction of the D. C. electric field whereby there is set up an electric field which combines with the transverse electric field of said wave.

7. In amplifying apparatus a wave transmission circuit to be supplied with a transverse magnetic wave for propagation therethrough for providing a phase velocity thereto fast in comparison with the velocity of light, an element of material exhibiting a large magneto-resistive effect positioned with field coupling relation with said circuit whereby said wave propagates along said element, electrode means to be supplied with D. C. potentials positioned across opposite faces of said element for creating therebetween a D. C. electric field perpendicular to the direction of wave propagation and parallel to the direction of the magnetic field of said wave, and means for creating a D. C. magnetic field perpendicular to the direction of wave propagation and parallel to the direction of the transverse magnetic field of said wave whereby there is created an electric field which combines with the electric field of said wave.

8. In combination, a conductively bounded hollow wave guiding member having input and output ends, an element of material exhibiting a large magneto-optic effect disposed within said member, electrode means disposed on opposite faces of said element for creating a D. C. electric field in said element in a direction transverse to the magnetic field of the wave propagating through said member, input coupling means to be supplied with input signals at the input end of said member, and output coupling means to supply utilization apparatus at the output end of said member.

9. In combination, a conductively bounded hollow wave guiding member having input and output ends, an element of material exhibiting a large Hall effective disposed within said member, electrode means disposed axially along said element for creating a D. C. electric field along said element parallel to the direction of wave propagation in said member, input coupling means to be supplied with input signals at the input end of said member, and output coupling means to supply utilization apparatus at the output end of said member.

10. In combination, a conductively bounded hollow wave guiding member having input and output ends, an element of material exhibiting a large magneto-resistive effect disposed within said member, electrode means disposed on opposite faces of said element for creating a D. C. electric field in said member perpendicular to the direction of wave propagation in said member, means for creating a magnetic field perpendicular to the direction of the D. C. electric field and to the direction of wave propagation in said member, input coupling means to be supplied with input signals at the input end of said member, and output coupling means to supply utilization apparatus at the output end of said member.

11. In combination, a solid dielectric wave guiding member having input and output ends, an element of material exhibiting a large magneto-optic effect extending adjacent said member in field coupling relationship therewith, electrode means creating a D.-C. electric field along said element, input coupling means to be supplied with input signals at the input end of said member, and output coupling means to supply utilization apparatus at the output end of said member.

12. In combination, a solid dielectric wave guiding member having input and output ends, an element of material exhibiting a large Hall effect extending adjacent said member in field coupling relationship therewith, electrode means creating a D.-C. electric field along said element parallel to the direction of wave propagation, input coupling means to be supplied with input signals at the input end of said member, and output coupling means to supply utilization apparatus at the output end of said member.

13. In combination, a solid dielectric wave guiding member having input and output ends, an element exhibiting a large magneto-resistive effect extending adjacent said member in field coupling relationship therewith, electrode means for creating a D.-C. electric field in said element perpendicular to the direction of wave propagation, means creating a D.-C. magnetic field in said element perpendicular to the D.-C. electric field and to the direction of wave propagation, input coupling means to be supplied with input signals at the input end of said member, and output coupling means to supply utilization apparatus at the output end of said member.

14. In apparatus which utilizes the interaction between a flow of charged particles in a solid and a traveling electromagnetic wave, a radio frequency wave circuit for propagating an electromagnetic wave having electric and magnetic field components, a solid exhibiting strong magneto-optic properties in coupling relationship with the electromagnetic wave, and electrode means for applying a steady electric field along one axis of said element such that the component of the magnetic field of said wave is in a direction normal to the direction of steady electric field for interacting continuously with the flow of charged particles within said element whereby the wave in said circuit is amplified continuously.

15. In a device which utilizes the interaction between a flow of charged particles in a solid and a traveling electromagnetic wave, a radio frequency circuit for propagating an electromagnetic wave having electric and magnetic field components, a solid exhibiting strong magneto-optic effects in coupling relationship with the electromagnetic wave over a plurality of operating wavelengths, input and output coupling connections to said wave circuit for applying input and abstracting output electromagnetic waves, and electrode means for applying a steady electric field along said element parallel to the direction of wave propagation through said element, the component of the magnetic field of the said wave being in a direction normal to the direction of said steady electric field for interacting continuously with the flow of charged particles within said element whereby power is supplied continuously to said wave.

References Cited in the file of this patent

UNITED STATES PATENTS

| | | |
|---|---|---|
| 1,596,558 | Sokoloff | Aug. 17, 1926 |
| 2,051,537 | Wolff et al. | Aug. 18, 1936 |
| 2,464,807 | Hansen | Mar. 22, 1949 |
| 2,524,290 | Hershberger | Oct. 3, 1950 |
| 2,553,490 | Wallace | May 15, 1951 |
| 2,600,500 | Haynes et al. | June 17, 1952 |
| 2,629,079 | Miller et al. | Feb. 17, 1953 |
| 2,644,930 | Luhrs et al. | July 7, 1953 |
| 2,649,574 | Mason | Aug. 18, 1953 |

OTHER REFERENCES

Goldstein et al.: "Physical Review," vol. 82, No. 6, June 15, 1951, pages 956 and 957.